United States Patent [19]
German

[11] 3,746,392
[45] July 17, 1973

[54] CYCLE SADDLE

[76] Inventor: Lorrayne T. German, 1502 Grove Drive, Richmond, Va. 23220

[22] Filed: Nov. 17, 1971

[21] Appl. No.: 199,412

[52] U.S. Cl.............. 297/380, 297/195, 297/243, 297/DIG. 9
[51] Int. Cl............................................. B62j 1/20
[58] Field of Search................. 297/380, 243, 214, 297/195, 250, 252, DIG. 9, DIG. 1

[56] References Cited
UNITED STATES PATENTS

| | | | |
|---|---|---|---|
| 2,607,400 | 8/1952 | Witz.................................. | 297/380 |
| 2,865,433 | 12/1958 | Warner............................... | 297/250 |
| 460,072 | 9/1891 | Jones................................. | 297/243 X |
| 3,154,345 | 10/1964 | Lambrecht........................ | 297/DIG. 1 |
| 1,662,718 | 3/1928 | Regard.............................. | 297/243 X |
| 2,239,669 | 4/1941 | Blake................................. | 297/380 X |
| 1,140,997 | 5/1915 | Ninehart........................... | 297/380 X |
| 3,619,003 | 11/1971 | Rich, Jr. ........................... | 297/243 |

*Primary Examiner*—James T. McCall
*Attorney*—William A. Strauch et al.

[57] ABSTRACT

A seat structure for ready attachment and detachment from the luggage carriers of cycle type vicles providing a padded seat and back rest maintained in operative relation by strap means detachably secured to ring connectors disposed at the forward corners of the seat and encircling the back rest adjacent its upper edge so as to be inclined downwardly and forwardly past the thighs of the occupant to provide centering side support. The seat structure be comprised of a one piece foam rubber padding enclosed in a stout fabric covering having an elongated pad inserting opening in the lower face of the seat portion to expose a protuberant portion of the padding for intimate deformable engagement with the luggage carrier to obviate relative shifting of the seat structure and luggage carrier and having dependent stirrup straps fixedly secured to the front seat corners to support the occupant's feet and slidably mount the strap ring connectors thereby assuring a balanced seating of the occupant and tensioning of the strap means to increase the supporting function of the back rest and the thigh engaging strap runs due to the weight component acting through the stirrup straps.

5 Claims, 8 Drawing Figures

PATENTED JUL 17 1973 3,746,392
SHEET 1 OF 2
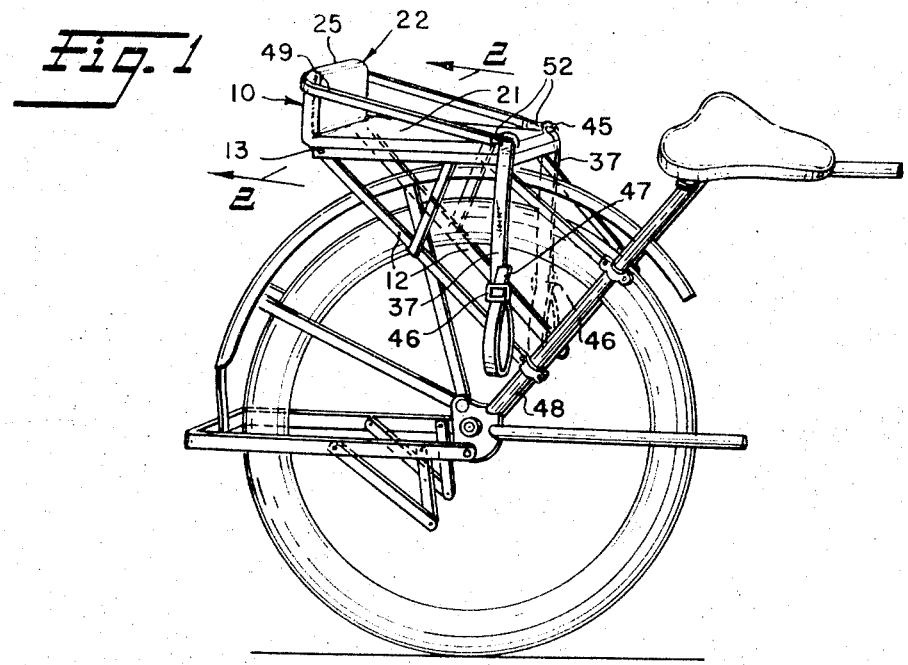
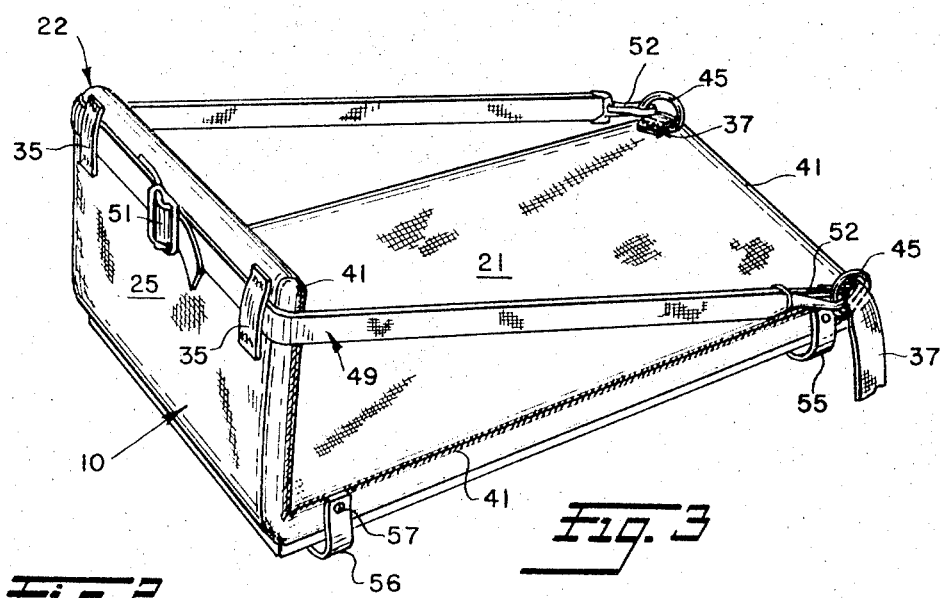
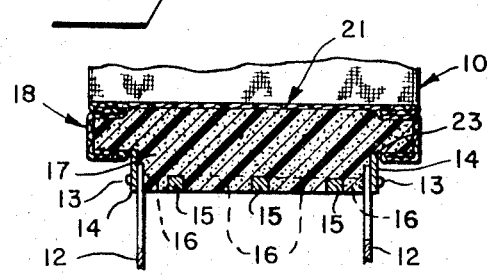
INVENTOR
LORRAYNE T. GERMAN
BY Strauch Nolan Neale Nies + Kurz
ATTORNEYS

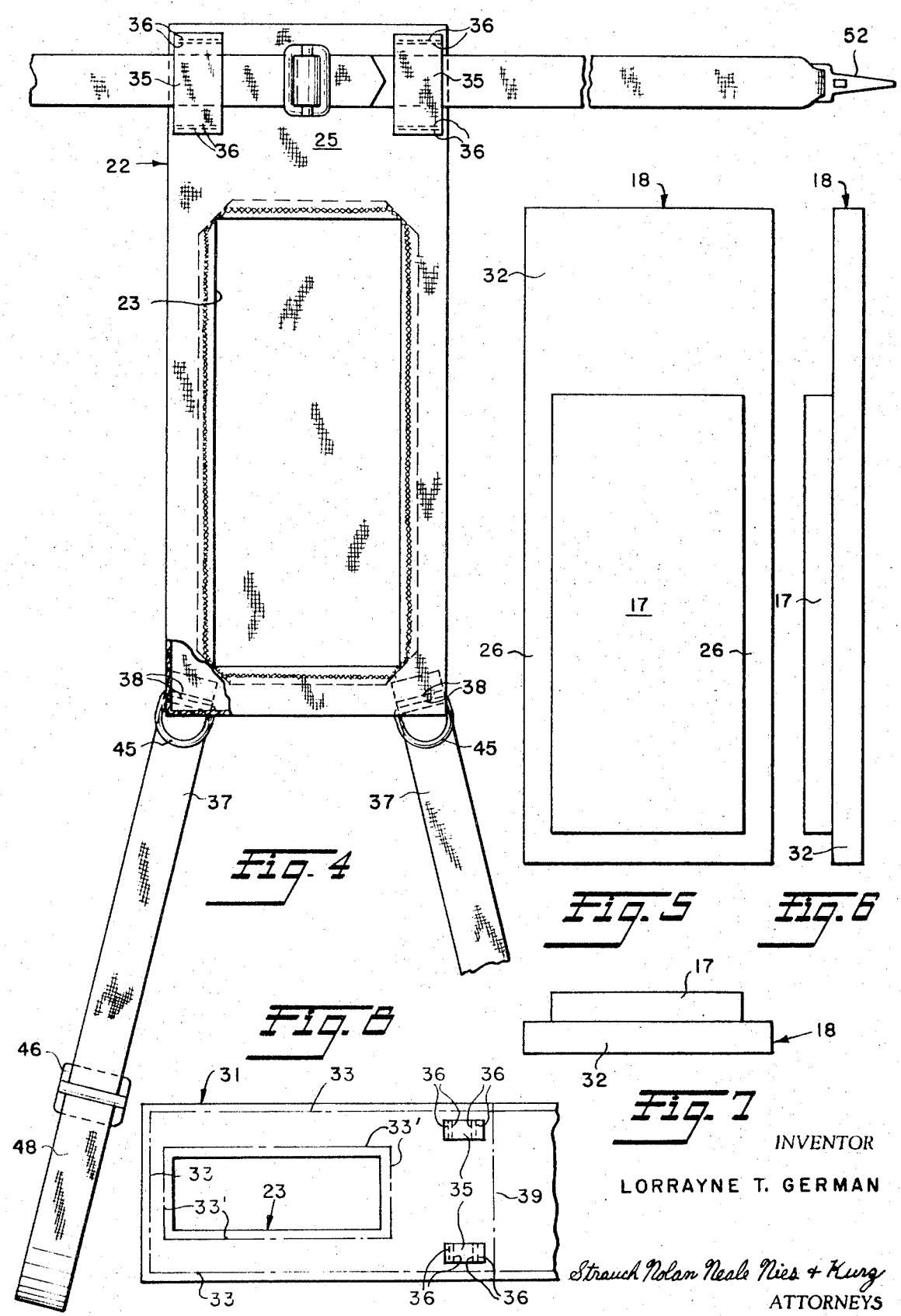

0
CYCLE SADDLE

BACKGROUND OF THE INVENTION

The present invention is directed to the provision of an auxiliary seat structure for converting fender type luggage carriers of the type conventionally provided on bicycles, motor cycles, and similar vehicles into passenger seats. Prior art auxiliary seat structures of this type for the most part comprise heavy, expensive, padded structures having attachment fastenings or straps which are both difficult and time consuming to manipulate when installing and removing the seat structures. Furthermore, most auxiliary seat structures of the prior art provided for such usage, particularly those provided for mounting on the luggage carriers of bicycles, do not provide backrests, side supports, and adequate foot supports to enable their occupants to maintain a firm balanced seating as the cycle tilts and turns in operation. As a consequence, the prior art auxiliary seat structures fail to meet the need for a readily attachable and removable seat structure which will assure a safe seating for the occupants, particularly when the occupant is a child riding as a passenger with a parent or older brother, sister, or a friend, or easy handling and storage.

SUMMARY OF THE INVENTION

The present invention meets all of these needs by providing an auxiliary seat structure of a simple and inexpensive construction which may be merely set upon the luggage carrier with assurance that it will establish a non-slipping engagement with the carrier when the occupant becomes seated and will at the same time support the occupant against any appreciable movement relative to the seat.

It, accordingly, is a primary objection of the present invention to provide a removable auxiliary seat structure for converting a cycle luggage carrier into a stable passenger seat which is simple in construction, inexpensive to produce, and may be applied to and detached from the luggage carrier with minimal effort.

A further important object of the present invention is to provide a removable auxiliary seat structure according to the preceeding object wherein the seat structure comprises a fabric cover member defining respective elongated panels secured in superposed spaced relation by respective side and end wall panels, a compressible filler padding, insertable into the cover member through a filler opening offset toward one end of one of the elongated panels, having a protruding formation shaped to snugly engage the edges of the filler opening, and strap means spanning the other end of the one elongated panel from side-to-side and defining end runs of a length less than that of said elongated panels adapted at their free ends to be removably secured to the corners of the cover member at the end remote from said one end to displace the filler and cover member at the one end to an angular position thereby forming a seat portion, back rest, and thigh engaging strap runs protruding oppositely from the protruding formation of the compressible filler padding disposed to non-slippingly engage the carrier when the seat portion is occupied.

A further object of the present invention is to provide the seat structure of the preceeding object with adjustable length stirrup straps fixedly secured to the corners of the cover at the end to which the free ends of the strap end runs are connected for receiving the feet of the passenger occupant whereby upon tilting movement of the cycle, for example in turning, the passenger may effect a shift in the distribution of his weight to counter the tilt of the cycle and reduce the effective weight component tending to shift the auxiliary seat structure relative to the luggage carrier in the direction of tilt.

BRIEF DESCRIPTION OF THE DRAWINGS

Still further objects will appear from the following description and appended claims when read in conjunction with the accompanying drawings wherein:

FIG. 1 is a fragmental perspective view of the rear end of a conventional bicycle and fender type luggage carrier fitted with an auxiliary seat structure in accord with this invention;

FIG. 2 is a fragmental sectional view taken substantially along line 2—2 of FIG. 1 showing how the auxiliary seat of this invention interfits with the luggage carrier carrier to restrain the auxiliary seat against sliding movement relative to the luggage carrier;

FIG. 3 is an enlarged perspective view of the auxiliary seat of FIG. 1 as viewed from the left of FIG. 1 and above to illustrate the strap means, stirrup straps and the manner of connecting and/or attaching them to the basic seat structure of this invention;

FIG. 4 is a plan view of the cover member as seen from the underside of FIG. 1 prior to insertion of the filler padding;

FIGS. 5, 6 and 7 are respectively a bottom plan view, side elevational view, and end elevational view of a preferred filler padding constructed for use in this invention; and FIG. 8 is a partial plan view of a cloth blank that may be employed in making the outer covering of the auxiliary seat structure of FIG. 1.

DESCRIPTION OF PREFERRED EMBODIMENT

With continued reference to the drawings wherein like reference numerals are employed throughout to indicate the same parts throughout the several views, the auxiliary seat of this invention is indicated by numeral 10. In FIG. 1, the seat 10 is shown in place on a conventional open work, metal type luggage carrier 11 of well known construction having downwardly inclined support struts 12 pivotally connected at the upper ends by rivets 13 (FIGS. 1 and 2) to the encircling outer frame member 14 of elongated rectangular configuration in plan. Reinforcing struts 15 extending longitudinally of frame member 14 and cross-struts 16 (FIG. 2) rigidify frame member 14 along its lower edge and embed themselves into the downwardly protruding base portion 17 of compressible filler padding 18 of this invention to be presently described. In this connection, the degree of embedment depends primarily on the weight of the seat and its occupant but in any event, it is sufficient to effectively prevent relative shifting movement sidewise and to and fro of seat structure 10 relative to luggage carrier 11.

In other types of cycle luggage carriers, it is customary to provide a generally planar carrier surface having groove like, longitudinal indentations in the surface or some form of roughened load bearing surface. Whatever form this load bearing surface may take, the base portion 17 of a one piece compressible filler padding 18 will effect a non-slipping engagement therewith generally proportional to the combined weight of the seat and occupant. It follows, therefore, that relative slippage of seat 10 is effectively forestalled so long as the occupant remains substantially centered and erectly seated upon the seat portion 21.

To assure such a non-slip seat, seat 10 is constructed of a heavy fabric, bag-like cover member 22 generally rectangular configuration closed at its opposite ends and formed inwardly from one end in one face panel with a rectangular pad insertion opening 23 terminating a substantial distance inwardly from the other end. The cover is dimensioned to snugly receive the upper large area portion of one-piece, resilient, filler padding 18 leaving integrally formed base portion 17 protruding through opening 23.

While any suitable material may be used for cover member 22 and filler padding 18, a tough fabric, such as duck or light canvas, having good wearing properties to assure maximum service life is preferred for the cover and filler padding 18 is formed of dense resilient foam rubber panels. In a typical seat, filler padding 18 will have an overall thickness of the order of two inches in the area of base portion 17 and about one half that thickness in the bordering areas including the lengthened end portion 24 (FIG. 5) and its overall length and width will be of the order of 23½ and 9 inches respectively to properly fill out the cover member 22 to be presently described in detail. When inserted into cover member 22, padding end portion 24 fills out the end 25 of cover member 22 while the marginal side portion 26 and marginal end portion 27 of padding 18 fill out the peripheral margins of cover member 22 along the sides and the opposite end of opening 23.

While cover member 22 may be constructed in any suitable manner, it is preferably formed from a one-piece elongated, rectangular blank 31 generally shaped as shown in FIG. 8 which illustrates in detail a blank from which cover member 22 may be formed. As shown in FIG. 8, the blank is cut from a piece of material having a width exceeding by approximately one inch the horizontal dimension of padding 18 as seen in FIG. 5 and twice the thickness of the larger portion 32 of padding 18 as seen in FIG. 6 and a length exceeding by approximately one inch the vertical dimension of padding 18 and twice the thickness of the larger portion 32 of padding 18. This additional one inch of material allows for half inch marginal portions delimited inwardly by dot-dash lines 33 (FIG. 8) at the opposite sides and opposite ends of the blank, one end only being shown in FIG. 8, that serve as seaming flaps in completing the cover. One end segment of the blank, the left end segment of FIG. 8, is cut out to form opening 23, the cutting being effected inwardly of the clear opening as seen in FIG. 4 a distance of one half inch to provide marginal portions delimited by dot-dash lines 33' (FIG. 8) also serving as seaming flaps.

Starting with the blank cut out as shown in FIG. 1, the four corners of the cut opening are slit outwardly along a 45° path to provide respective pairs of side flaps and end flaps which are folded outwardly under the left hand main body portion of the blank and secured together in any suitable manner, for example by stitching in a continuous operation as indicated by stitching 34 (FIG. 4) to finish off the edges of opening 23. The inner corners of the left panel of the blank of FIG. 8 are then provided with respective laterally aligned strap loops 35 double stitched at 36 to the upper face of the blank of FIG. 8. Respective straps 37 (FIGS. 1, 3 and 4) are then double stitched at 38 to the under face of the right panel of the blank (See FIG. 4) inwardly of the corners at its free end at an angle as shown to serve as foot supports as will be hereinafter pointed out.

The two ends of the blank are then brought together by folding the blank end for end along fold line 39 (FIG. 8), downwardly as viewed in FIG. 8, to dispose the respective peripheral marginal portions along the sides and opposite free ends of the blank into overlying abutting contact. The cover is then completed by stitching the marginal portions together adjacent the dot-dash lines 32 to form a continuous seam 41 (FIG. 3) along the opposite sides and the end remote from fold line 39 when the sewn cover is turned inside out.

By constructing the cover in this manner, material wastage is reduced to a minimum since the portion cut out to form opening 23 can be used to make the strap loops 35 and the remainder of the cutting can be planned to have adjacent segments of the material serve as respective covers 22. Furthermore, this manner of forming the cover reduces the stitching operations to a minimum since a single continuous stitching operation finishes off the edges of opening 23, a single continuous stitching operation closes the opposite sides and the single open end of the folded blank, a simple back and forth stitching operation suffices to double stitch the opposite ends of the respective strap loops 35 in place, and a simple back and forth stitching operation suffices to double stitch the ends of straps 37 in place.

Once the cover is completed, the padding 18 is inserted endwise into place thorugh opening 23 one end at a time to provide an elongated structure as viewed from the back as shown in FIG. 4 with protruding base portion 17 projecting outwardly through cover opening 23 and the portions of the cut out half of cover member 22 defining opening 23 enclosing the edges and undersides of the larger portion 32 of padding 18. Snap catch half rings 45 are then threaded onto straps 37 from the free ends of the straps followed by threading loop buckles 46 into place and looping the free ends 47 through buckles 46 to form foot stirrups 48 (FIGS. 1 and 4). A two piece strap 49 joined midway of its ends by a strap buckle 51 and conventionally provided at its opposite free ends with snap catches 52 is then threaded through loops 35 to complete seat structure 10.

The resulting seat structure 10, due to the flexible nature of padding 18 and cover member 22, may be folded or rolled endwise for compacting it for storage or may be merely suspended from strap 49 and snap catches 52 for storage if desired. When seat structure 10 is put into use, the protruding padding portion 17 is placed face down on luggage carrier 11 with the foot support straps 37 depending at the front corners of the luggage carrier. The snap catch half rings 45 are then moved upwardly along straps 37 into the position shown in FIGS. 1, 3 and 4 and the seat structure is bent upwardly around a lateral fold line lying in the plane of the edge of protruding portion 17 to dispose the end 25 of cover member 22 in a substantially vertically upstanding position as shown in FIGS. 1 and 3. Snap catches 52 are then secured to half rings 45 as best shown inFIGS. 1 and 3 to maintain the end 25 in its upstanding position relative to the remainder of the seat structure. In this connection the weight of the foot support straps 37 applied through half rings 45 and the runs of strap 49 connected thereto, are sufficient to secure this latter end.

When in use, the occupant of the seat straddles the seat proper and luggage carrier with his feet disposed in the stirrups 48 and the upstanding seat portion 25 pressed against the lower part of his back due to the tensioning of the strap 49 by reason of the added weight component of his supported feet and legs. The tensioned end of strap 49 additionally extend downwardly and forwardly along the occupant's thighs while the occupant's body weight applied to the seat proper deforms the protruding portion 17 of padding 18 into interlocking engagement with the irregular mating surfaces of the luggage carrier. As a consequence, relative slippage between the seat structure 10 and luggage carrier 11 is effectively obviated, the occupant is firmly supported at the back and along both sides by the seat structure 10 and his feet and legs are constrained by support straps 37, when properly adjusted lengthwise, to assume a forward and downward inclination away from the rear wheel to distribute his weight in a manner to balance the cycle and militate against his being pitched forward upon sudden braking of the cycle. It follows, therefore, that the seat structure of the present invention provides an exceedingly safe auxiliary cycle seat, one which is ideally suited for carrying a small child as a passenger.

Should it be desired to do so a further strap 55 (FIG. 3) may be snap connected to half rings 45 and carried crosswise beneath the luggage carrier and a further strap 56 (FIG. 3) may be stitched at 57 to cover member 22 at opposite points and buckled beneath the luggage carrier to assure securement of seat structure 10 to luggage carrier 11 when unoccupied or when a passenger uses stirrups 48 in mounting the seat.

Alternatively, straps 37 and 49, may be employed as securing straps in place of the additional straps 55 and 56 where the seat occupant is an older child or adult who does not require the additional support provided by the backrest, foot support straps and thigh straps.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A passenger seat structure for the luggage carriers of cycle type vehicles comprising a cover member of fabric material providing an elongated upper panel peripherally joined along its respective sides and ends to an elongated lower panel of equal area having an elongated rectangular pad insertion through opening adjacently related to one end and the opposite sides and extending toward the other end to an opening delimiting end substantially inset from said other end; an elongated pad of compressible deformable material dimensioned to fill said cover member between said elongated panels and having on one face a rectangular protruding formation inset from its opposite sides and ends located and dimensioned to protrude through in close fit relation said pad insertion through opening; respective strap loops fixedly secured in laterally spaced alignment in the corners of the outer face of said lower panel adjacent said other end of said lower panel; strap means extending laterally across said outer face of said lower panel between and through said aligned strap loops with its end runs extending beyond said strap loops a distance substantially less than the length of said filled cover member; snap hooks fixed to the free ends of said end runs of said strap means; stirrups straps end connected to the outer face of said upper panel at the corners remote from said other end of said lower panel, said stirrup straps extending from said corners at an angles such that they diverge axially from said corners and slidably mounting respective strap connector rings between their corner connected ends and their free ends which are returned looped outwardly and secured in respective strap buckles adjustably slidingly carried by their intermediate portions to form foot support stirrups, said strap means being adapted, when hook connected to said strap connector rings after said seat structure is seated on a cycle luggage carrier, to deflect said end of said seat structure beyond said opening delimiting end to a substantially right angular position relative to the remainder of said seat structure to form a seat back rest.

2. The passenger seat structure of claim 1 wherein said strap means when connected to said strap rings form with said seat portion and said seat back rest forwardly and downwardly inclined strut-like thigh engaging members cooperating with said back rest to center an occupant laterally in said seat and restrain the occupant against sidewise movement relative to said seat structure.

3. The passenger seat structure of claim 1 wherein said stirrup straps depend from the opposite forward corners of the seat structure in position to supportingly receive the feet of the seat occupant thereby enabling the occupant to maintain a balanced seating in said seat structure.

4. The passenger seat structure of claim 1, wherein the rectangular protruding formation of said elongated pad directly abuts the upper face of the luggage carrier and, due to its compressible deformable nature, intimately cooperates with carrier upper face to prevent shifting of the seat structure relative to the carrier.

5. The passenger seat structure of claim 4 wherein said seat structure is provided inwardly of said back rest and inwardly of its opposite end with respective cross strap means disposed to be buckled cross wise beneath said luggage carrier to draw said seat structure into intimate cooperation with the upper carrier face to secure said seat structure against shifting relative to the carrier when not occupied or in event a child occupant uses the stirrups for mounting the seat.

* * * * *